United States Patent
Berwald et al.

(10) Patent No.: US 7,596,856 B2
(45) Date of Patent: *Oct. 6, 2009

(54) METHOD FOR MANUFACTURING A SOFT MAGNETIC METAL ELECTROMAGNETIC COMPONENT

(75) Inventors: Thomas J. Berwald, Grand Haven, MI (US); Kendall S. Page, Holland, MI (US); Andrew D. Hirzel, Kalamazoo, MI (US)

(73) Assignee: Light Engineering, Inc., Indianapolis, IN (US)

( * ) Notice: Subject to any disclaimer, the term of this patent is extended or adjusted under 35 U.S.C. 154(b) by 459 days.

This patent is subject to a terminal disclaimer.

(21) Appl. No.: 11/172,141

(22) Filed: Jun. 30, 2005

(65) Prior Publication Data

US 2005/0258705 A1 Nov. 24, 2005

Related U.S. Application Data

(63) Continuation-in-part of application No. 10/876,034, filed on Jun. 24, 2004, now Pat. No. 7,258,759, which is a continuation of application No. 10/763,728, filed on Jan. 23, 2004, now Pat. No. 7,395,596, which is a continuation-in-part of application No. 10/458,944, filed on Jun. 11, 2003, now Pat. No. 7,018,498.

(51) Int. Cl.
*H01F 7/06* (2006.01)

(52) U.S. Cl. .................... 29/605; 29/592.1; 29/603.23; 29/606; 29/609; 156/153; 156/191; 156/193; 156/305; 310/43; 310/216; 310/235; 335/297; 336/122

(58) Field of Classification Search ............... 29/602.1, 29/605, 606; 310/43, 216, 235; 335/297; 336/122; 156/153, 191, 193, 305
See application file for complete search history.

(56) References Cited

U.S. PATENT DOCUMENTS 2,293,951 A 8/1942 Seastone et al. ............... 175/21

(Continued)

FOREIGN PATENT DOCUMENTS

DE 4030124 A 3/1992

(Continued)

OTHER PUBLICATIONS

DeCristofaro, Nicholas, "Amorphous Metals in Electric-Power Distribution Applications," Materials Reasearch Society, MRS Bulletin, vol. 23, No. 5, pp. 50-56(1998).

(Continued)

*Primary Examiner*—Paul D Kim
(74) *Attorney, Agent, or Firm*—Ernest D. Bluff & Associates, LLC; Ernest D. Bluff; Gordon F. Fish

(57) ABSTRACT

An electromagnetic component is formed from a pre-form comprising layers of soft magnetic metal ribbon. Adhesive is applied to permeate the pre-form and is then cured. The bonded pre-form is placed within a milling assembly that supports and constrains the ribbon layers during a milling operation used to process the pre-form into an electromagnetic component shape. Optionally, the shape is thermally processed. The resulting electromechanical component has attractive soft magnetic properties, including low core loss, that render it useful as a component in electric motors and generators and static inductive devices operable at high excitation frequencies.

33 Claims, 9 Drawing Sheets

U.S. PATENT DOCUMENTS

| | | | | |
|---|---|---|---|---|
| 2,495,167 | A | 1/1950 | Horstman et al. | 148/14 |
| 2,554,262 | A | 5/1951 | Nagel | 154/43 |
| 3,401,287 | A | 9/1968 | French | 310/168 |
| 4,621,248 | A | 11/1986 | Shigeta et al. | 336/178 |
| 4,734,975 | A | 4/1988 | Ballard et al. | 29/606 |
| 5,028,830 | A | 7/1991 | Mas | 310/211 |
| 6,462,456 | B1 | 10/2002 | DeCristofaro et al. | 310/216 |
| 6,559,570 | B2 | 5/2003 | DeCristofaro et al. | 310/216 |
| 6,803,694 | B2 | 10/2004 | DeCristofaro et al. | 310/216 |
| 7,018,498 | B2 * | 3/2006 | Berwald et al. | 156/193 |
| 7,067,950 | B2 | 6/2006 | Hirzel | 310/216 |
| 7,258,759 | B2 * | 8/2007 | Berwald et al. | 156/193 |
| 2003/0111926 | A1 | 6/2003 | DeCristofaro et al. | 310/216 |

FOREIGN PATENT DOCUMENTS

| | | | |
|---|---|---|---|
| GB | 597218 | A | 1/1948 |
| JP | 56104425 | A | 8/1981 |

OTHER PUBLICATIONS

Rabinkin, Anatol, "Brazing with amorphous foil performs," reprinted from Jun. 2001 issue of Advanced Materials and Procesess.

Van Schevensteen, Raymond et al., "Energy Efficient Distribution Transformer Soulutions," downloaded from www.metglass.com, Jun. 4, 2003.

Rabinkin, Anatol, "Optimization of Brazing Technology, Structrual Integrity, and Preformance of Multi-Channeled, Three Dimensional Metallic Structures." Downloaded from www.metglass.com, Jun. 4, 2003.

Rabinkin, Anatol, "Overview: Brazing with (NICoCr)-B-Si Amorphous Brazing Filler Metals: Alloys, Processing Joint Stucture, Properties, Applications." Downloaded from www.metglass.com, Jun. 4, 2003.

* cited by examiner w = slot width
D = stator outer diameter
d = stator inner diameter T = tooth height
H = overall height

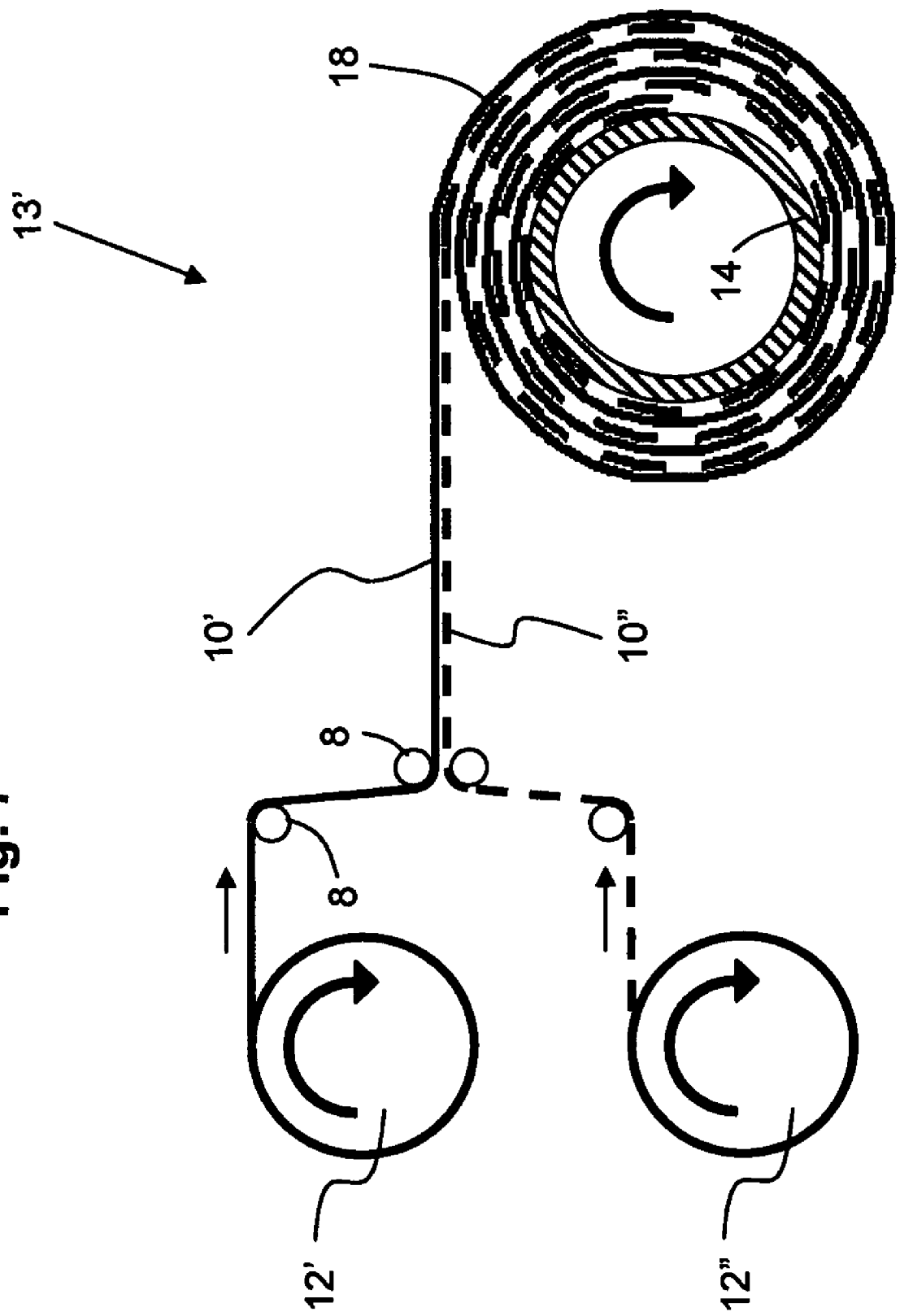

METHOD FOR MANUFACTURING A SOFT MAGNETIC METAL ELECTROMAGNETIC COMPONENT

RELATED U.S. APPLICATION DATA

This application is a continuation-in-part of U.S. patent application Ser. No. 10/876,034, filed Jun. 24, 2004 now U.S. Pat. No. 7,258,759 which, in turn, is a continuation of U.S. patent application Ser. No. 10/763,728, filed Jan. 23, 2004 now U.S. Pat. No. 7,395,596 which, in turn, is a continuation-in-part of U.S. patent application Ser. No. 10/458,944, filed Jun. 11, 2003 now U.S. Pat. No. 7,018,498. Each of application Ser. Nos. 10/876,034, 10/763,728, and 10/458,944 is incorporated herein in its entirety by reference thereto.

BACKGROUND OF THE INVENTION

1. Field of the Invention

The invention relates to an electromagnetic component; and more particularly, to an electromagnetic component appointed for use in a dynamoelectric machine or inductive device, and a method for the manufacture of such a component.

2. Description of the Prior Art

Multi-pole rotating electromechanical or dynamoelectric machines, such as motors, generators, re-gen motors, alternators, brakes and magnetic bearings typically employ one or more electromagnetic components, which may include a stationary component known as a stator and a rotating component known as a rotor. Motors rotate by producing a rotating magnetic field pattern in an electromagnetic component that causes the rotor to follow the rotation of this field pattern. As the frequency varies, the speed of the rotor varies. To increase the shaft speed of the motor, the frequency of the input source must be increased. For certain applications, like electric or hybrid cars, electric motors operable at high speed but also having high efficiency are especially desirable.

Adjacent faces of the rotor and stator in a rotating machine are separated by a small airgap traversed by magnetic flux linking the rotor and stator. It will be understood by those skilled in the art that a rotating machine may comprise plural, mechanically connected rotors and plural stators. Virtually all rotating machines are conventionally classifiable as being either radial or axial airgap types. A radial airgap type is one in which the rotor and stator are separated radially and the traversing magnetic flux is directed predominantly perpendicular to the axis of rotation of the rotor. In an axial airgap device, the rotor and stator are axially separated and the flux traversal is predominantly parallel to the rotational axis.

Except for certain specialized types, motors and generators generally employ soft magnetic materials of one or more types. By "soft magnetic material" is meant one that is easily and efficiently magnetized and demagnetized. The energy that is inevitably dissipated in a magnetic material during each magnetization cycle is termed hysteresis loss or core loss. The magnitude of hysteresis loss is a function both of the excitation amplitude and frequency. A soft magnetic material further exhibits high permeability and low magnetic coercivity. Motors and generators also include a source of magnetomotive force, which can be provided either by one or more permanent magnets or by additional soft magnetic material encircled by current-carrying windings. By "permanent magnet material," also called "hard magnetic material," is meant a magnetic material that has a high magnetic coercivity and strongly retains its magnetization and resists being demagnetized. Depending on the type of machine, the permanent and soft magnetic materials may be disposed either on the rotor or stator.

By far, the preponderance of dynamoelectric machines currently produced use as soft magnetic material various grades of electrical or motor steels, which are alloys of Fe with one or more alloying elements, especially including Si, P, C, and Al. Most commonly, Si is a predominant alloying element. While it is generally believed that motors and generators having rotors constructed with advanced permanent magnet material and stators having cores made with advanced, low-loss soft materials, such as amorphous metal, have the potential to provide substantially higher efficiencies and power densities compared to conventional radial airgap motors and generators, there has been little success in building such machines of either axial or radial airgap type. Previous attempts at incorporating amorphous material into conventional radial or axial airgap machines have been largely unsuccessful commercially.

Electromagnetic components are also widely used in static inductive devices, such as transformers and inductors, which are essential components of a wide variety of modern electrical and electronic equipment. Most of these devices employ a core comprising a soft ferromagnetic material and one or more electrical windings that encircle the core. Inductors generally employ a single winding with two terminals, and serve as filters and energy storage devices. Transformers generally have two or more windings. They transform voltages from one level to at least one other desired level, and electrically isolate different portions of an overall electric circuit. Inductive devices are available in widely varying sizes with correspondingly varying power capacities. Different types of inductive devices are optimized for operation at frequencies over a very wide range, from DC to GHz. Virtually every known type of soft magnetic material finds application in the construction of inductive devices. Selection of a particular soft magnetic material depends on the combination of properties needed, the availability of the material in a form that lends itself to efficient manufacture, and the volume and cost required to serve a given market. In general, a desirable soft ferromagnetic core material has high saturation induction $B_{sat}$ to minimize core size, and low coercivity $H_c$, high magnetic permeability $\mu$, and low core loss to maximize efficiency.

The construction of electromagnetic components for high frequency electric devices, including both static and rotating devices, is problematic. Components employing iron or steel as a soft magnetic material to concentrate and shape magnetic flux are quite commonly used. However, at high frequencies, conventional iron or steel components are no longer practical. The core losses of the iron or steel components increase with increasing excitation frequency, reducing overall device efficiency. Additionally, at very high exciting frequencies, the component may become extremely hot, cannot be cooled by any reasonably acceptable means, and may cause device failure. Many present dynamoelectric machines must operate at high rotational speed and thus would benefit from use of a high synchronous exciting frequency, by which is meant a frequency greater than 400 Hz.

The requirements for static devices are often even greater, as power conditioning electronic systems now commonly employ switch-mode circuit topologies in which transformers and inductors operable at frequencies of 1 to 200 kHz are essential. In some circuits, operation at up to 1 MHz or more is desired. Accordingly, satisfactory components and methods for the fabrication thereof are highly sought.

Components such as motors and small to moderate size inductors and transformers for electrical and electronic devices often are constructed using laminations stamped or punched from various grades of magnetic steel supplied in sheets having thickness as low as 100 μm. The laminations are generally stacked and secured and subsequently wound with the requisite one or more electrical windings that typically comprise high conductivity copper or aluminum wire. These laminations are commonly employed in cores with a variety of known shapes. Dynamoelectric device components typically are formed with plural radially directed teeth and adjacent slots to accommodate phase windings that encircle the teeth.

Many of the shapes used for inductors and transformers are assembled from constituent components which have the general form of certain block letters, such as "C," "U," "E," and "I," by which the components are often identified. The assembled shape may further be denoted by the letters reflecting the constituent components; for example, an "E-I" shape would be made by assembling an "E" component with an "I" component. Other widely used assembled shapes include "E-E," "C-I," and "C-C." Constituent components for prior art cores of these shapes have been constructed both of laminated sheets of stamped conventional crystalline ferromagnetic metal and of machined bulk soft ferrite blocks.

Advanced magnetic materials, including known amorphous and nanocrystalline metal alloys and optimized Fe-based crystalline materials. In particular, such materials are easy to magnetize and demagnetize, which means an electromagnetic component made therewith would have low power loss, low temperature rise at high frequency, extremely fast magnetization and easy conversion of electrical to mechanical energy. An electromagnetic component made of such a metal would generate less core losses and be able to operate at much higher frequencies, resulting in devices of exceptional efficiency and power density.

Nevertheless, certain of the physical properties of these advanced materials make conventional fabrication techniques difficult or impossible. Amorphous and nanocrystalline metal alloy is typically supplied as a thin, continuous ribbon having a uniform ribbon width. However, these metals are thinner and harder than virtually all conventional metallic soft magnetic alloys, so conventional stamping or punching of laminations causes excessive wear on fabrication tools and dies, leading to rapid failure. The resulting increase in the tooling and manufacturing costs makes fabricating bulk magnetic components using such conventional techniques commercially impractical. Various manufacturing techniques have been attempted by industry, including wire electrical discharge machining, electrochemical creep grinding, conventional electrical discharge machining, cutting, stamping, acid etching and fine blanking. None has proven satisfactory for reasons including cost-effectiveness, manufacturing repeatability, or process cycle time. The thinness of amorphous metals also translates into an increased number of laminations needed to form a component with a given cross-section and thickness, further increasing the total cost of an amorphous metal magnetic component. Machining techniques used for shaping ferrite blocks are also not generally suited for processing amorphous metals.

The properties of amorphous and nanocrystalline metal alloys are often optimized by an annealing treatment. However, the annealing generally renders the metal very brittle, further complicating conventional manufacturing processes. As a result of the aforementioned difficulties, techniques that are widely and readily used to form shaped laminations of conventional materials, including silicon steel and other similar metallic sheet-form FeNi- and FeCo-based crystalline alloys, have not been found suitable for manufacturing amorphous and nanocrystalline metal devices and components.

This inability to fabricate complex three dimensional shapes from soft magnetic ribbon while retaining satisfactory magnetic properties has been a significant impediment, for both dynamoelectric and static applications that require high efficiencies and low loss components. A production method that is cost effective, end use functional, and high volume capable, while also providing substantial design flexibility for end use requirements, is highly desirable. Amorphous metals thus have not been accepted in the marketplace for many devices; this is so, notwithstanding the great potential for improvements in size, weight, and energy efficiency that in principle would be realized from the use of a high induction, low loss material.

For electronic applications such as saturable reactors and some chokes, amorphous and nanocrystalline metal alloys have been employed in the form of spirally wound, round toroidal cores. Devices in this form are available commercially with diameters typically ranging from a few millimeters to a few centimeters and are commonly used in switch-mode power supplies providing up to several hundred volt-amperes (VA). This core configuration affords a completely closed magnetic circuit, with negligible demagnetizing factor. However, in order to achieve a desired energy storage capability, many inductors include a magnetic circuit with a discrete air gap. The presence of the gap results in a non-negligible demagnetizing factor and an associated shape anisotropy that are manifested in a sheared magnetization (B-H) loop. The shape anisotropy may be much higher than the possible induced magnetic anisotropy, increasing the energy storage capacity proportionately. Toroidal cores with discrete air gaps and conventional material have been proposed for such energy storage applications. However, the gapped toroidal geometry affords only minimal design flexibility. It is generally difficult or impossible for a device user to adjust the gap so as to select a desired degree of shearing and energy storage. In addition, the equipment needed to apply windings to a toroidal core is more complicated, expensive, and difficult to operate than comparable winding equipment for laminated cores. Oftentimes a core of toroidal geometry cannot be used in a high current application, because the heavy gage wire dictated by the rated current cannot be bent to the extent needed in the winding of a toroid. In addition, toroidal designs have only a single magnetic circuit. As a result, they are not well suited and are difficult to adapt for polyphase transformers and inductors, including especially common three-phase devices. Other configurations more amenable to easy manufacture and application are thus sought.

Moreover, the stresses inherent in a strip-wound toroidal core give rise to certain problems. The winding inherently places the outside surface of the strip in tension and the inside in compression. Additional stress is contributed by the linear tension needed to insure smooth winding. As a consequence of magnetostriction, a wound toroid typically exhibits magnetic properties that are inferior to those of the same strip measured in a flat strip configuration. Annealing in general is able to relieve only a portion of the stress, so only a part of the degradation is eliminated. In addition, gapping a wound toroid frequently causes additional problems. Any residual hoop stress in the wound structure is at least partially removed on gapping. In practice the net hoop stress is not predictable and may be either compressive or tensile. Therefore the actual gap tends to close or open in the respective cases by an unpredictable amount as required to establish a new stress equilibrium.

Therefore, the final gap is generally different from the intended gap, absent corrective measures. Since the magnetic reluctance of the core is determined largely by the gap, the magnetic properties of finished cores are often difficult to reproduce on a consistent basis in the course of high-volume production.

Amorphous metals have also been used in transformers for much higher power devices, such as distribution transformers for the electric power grid that have nameplate ratings of 10 kVA to 1 MVA or more. The cores for these transformers are often formed in a step-lap wound, generally rectangular configuration. In one common construction method, the rectangular core is first formed and annealed. The core is then unlaced to allow pre-formed windings to be slipped over the long legs of the core. Following incorporation of the pre-formed windings, the layers are relaced and secured. A typical process for constructing a distribution transformer in this manner is set forth in U.S. Pat. No. 4,734,975 to Ballard et al. Such a process understandably entails significant manual labor and manipulation steps involving brittle annealed amorphous metal ribbons. These steps are especially tedious and difficult to accomplish with cores smaller than 10 kVA. Furthermore, in this configuration, the cores are not readily susceptible to controllable introduction of an air gap, which is needed for many inductor applications. It is also difficult with step-lap core configurations to provide fully balanced polyphase devices, i.e., devices in which the electrical characteristics obtained at the terminals for each of the phases is substantially identical.

Accordingly, there remains a need in the art for component fabrication methods that permit manufacture of electric machines that are highly compact, efficient and reliable. Especially desired are methods that take full advantage of the specific characteristics associated with low-loss material, thus eliminating many of the disadvantages associated with conventional components. Ideally, the benefits include one or more of: efficient use of the soft magnetic material; improved electrical efficiency; and reliable, economical, and rapid large-scale production.

SUMMARY OF THE INVENTION

The present invention provides an electromagnetic component and a method for the manufacture thereof. Generally stated, the method comprises the steps of: (i) forming soft magnetic metal ribbon consisting essentially of a material selected from the group consisting of amorphous and nanocrystalline metals and optimized Fe-based alloy; (ii) containing the pre-form within a containment means, such as a milling assembly, that supports the pre-form on all sides; and (iii) milling the pre-form into a electromagnetic component shape. Optionally, adhesive is applied to the pre-form and cured. The adhesive, if present, and the containment means provide mechanical support and integrity, permitting the pre-form to withstand the mechanical stresses of machining, e.g. by milling using a horizontal mill, a vertical mill, a computer numeric control (CNC) machine, or any other common milling equipment. Thus, complex three dimensional soft magnetic metal shapes can be created.

The ability to create three dimensional soft magnetic metal shapes allows the use of soft magnetic metal for a variety of applications heretofore foreclosed by the mechanical characteristics of soft magnetic metal ribbon.

The components preferably are made from low loss, high frequency material. More preferably, the component is made of amorphous metals, nanocrystalline metals, and optimized grain-oriented or non-grain-oriented Fe-based materials. The introduction of these materials into electrical devices enables the device's frequency to be increased above 400 Hz with only a relatively small increase in core loss, as compared to the large increase exhibited in conventional machines, thus yielding a highly efficient electric device capable of providing increased power.

The electromagnetic component is beneficially employed in a variety of applications, including static and dynamic devices, such as inductive components (inductors, transformers, and the like) and rotors and stators for linear and rotating electric machines.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which:

FIG. 7 is a schematic view of a winding system used to prepare a toroidal pre-form of the invention having two co-wound layers;

DESCRIPTION OF THE PREFERRED EMBODIMENTS

Figure 1:
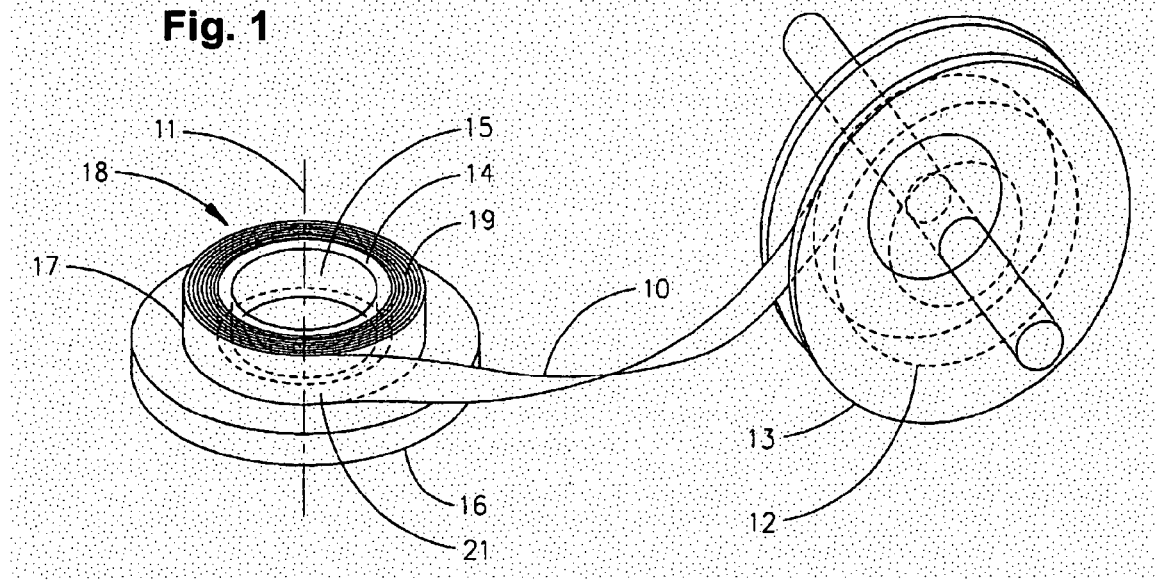
FIG. 1 is a perspective view depicting the winding of soft magnetic metal ribbon onto an inner ring.

Referring to FIG. 1, there is depicted an embodiment of the invention, wherein soft magnetic metal ribbon 10 is wound about a winding axis 11 on an inner ring 14. Winding machine 13 includes supply roll 12 containing an indeterminate length of soft magnetic metal ribbon 10. Inner ring 14 is placed on winding plate 16. Soft magnetic metal ribbon 10 is spirally wound on inner ring 14, forming soft magnetic metal toroid 18 having a toroid axis. Soft magnetic metal toroid 18 has inner side surface 15 and outer side surface 17, generally formed by the surfaces of the innermost and outermost ribbon layers. Toroid 18 also has a top 19, and a bottom 21, generally formed by the exposed and aligned edges of the ribbon layers.

The soft magnetic metal ribbon 10 can be wound using a variety of horizontal and vertical axis machines and methods. Preferably, a consistent, firm toroid to be used as a pre-form will have at least an 85% wind density compared to the inherent ribbon density. While FIG. 1 shows the formation of a soft magnetic metal toroid 18 having the shape of a right circular cylindrical shell, it will be appreciated that other desired three dimensional shapes could be created with a geometry distinctly different from the cylindrical form of toroid 18. It would be possible to create a variety of desired shapes by winding around a suitably configured mandrel or like winding form. For example, ribbon could be wound around a generally rectangular mandrel, preferably one having four rounded corners, to create an elongated, racetrack-like toroid configuration. Any of these or other similar forms may provide a pre-form for subsequent processing.

As used herein, the term toroid is understood to comprise any structure having plural layers of thin ribbon, spirally wound, layer upon layer, with the lateral edges of adjacent layers being in substantial alignment. Such a structure may be formed by winding a single extended length of ribbon; a plurality of extended lengths might also be wound sequentially. Alternatively, plural layers of ribbon may be co-wound. For example, FIG. 7 depicts generally at 13' a winding machine embodiment wherein two layers 10', 10" are taken from independent supply spools 12', 12" and co-wound into toroid 18, but it will be understood that other numbers of layers may be co-wound, e.g. five or more layers. The rotation of spools 12', 12" and toroid 18 and the feed direction are indicated by respective arrows in FIG. 7. The winding systems used to prepare pre-forms for the practice of the present method may include rollers 8, as well as other drive means known in web handling processes, such as guides, tension controls, or the like.

After winding, soft magnetic metal toroid 18 is optionally removed from winding plate 16. In one implementation, inner ring 14 is attached to the inner containment hat 20 as a single unit while ribbon 10 is being wound around inner ring 14.

An adhesive is then applied to the soft magnetic ribbon toroid 18 or other suitable pre-form in a manner to permeate the soft magnetic metal toroid 18. Preferably at least about half the surface area of each layer in toroid 18 is covered to provide sufficient integrity for the bonded pre-form. Inner ring 14 is still contained within the soft magnetic ribbon toroid 18. A suitable adhesive is Scotch Cast adhesive by 3M, which is an epoxy powder typically mixed with a solvent. A 20% mix with acetone by volume is found to be suitable. The adhesive is applied to soft magnetic ribbon toroid 18 by an ambient atmospheric soak process. Soft magnetic ribbon toroid 18 is immersed in the adhesive until the adhesive infiltrates the layers. The viscosity and dilution of the adhesive is chosen to attain adequate bonding. Too high a viscosity impedes adequate coverage and penetration, while excessive dilution is costly and requires more solvent to be removed during the curing process, potentially increasing cost and necessitating environmentally acceptable recovery measures.

Alternatively, the adhesive could be applied by a vacuum impregnation process, wherein the soft magnetic ribbon toroid 18 is immersed in an adhesive-containing vessel. Subsequent evacuation of air in the vessel enhances the infiltration of the adhesive between the layers in soft magnetic ribbon toroid 18. Other suitable application processes could also be used, such as application of adhesive to the soft magnetic ribbon during the winding process, utilizing a wet spray or dry electrolytic deposition process. Alternative resins, epoxies or adhesives may be used. Different brands as well as different types of resins, epoxies or adhesives may be used. For example, suitable adhesive agents may include those composed of epoxies, varnishes, anaerobic adhesives, cyanoacrylates, and room-temperature-vulcanized (RTV) silicone materials. Heat cured epoxies that require various elevated heat curing temperatures as well as two stage epoxies that cure at room temperature would also be suitable. Adhesives desirably have low viscosity, low shrinkage, low elastic modulus, high peel strength, high operating temperature capability, and high dielectric strength.

After soft magnetic ribbon toroid 18 is sufficiently infiltrated with adhesive, soft magnetic ribbon toroid 18 is allowed to drain. Once dry, soft magnetic ribbon toroid 18 is placed inside an oven for curing. Importantly, the temperature for heat curing the adhesive, if required, is a fraction of the temperature for heat processing soft magnetic metal ribbon 10. A preferable fraction is ½, although fractions ranging from about ¼ to ¾ might also be satisfactory.

In another aspect of the present process, a bonded pre-form, such as that created by the aforementioned curing of the infiltrated toroid or other form, is milled while being supported in a containment means that provides mechanical support and containment during machining.

Without being bound by any theory, it is believed that the amount of fracture and surface damage, and other deleterious effects is minimized by supporting the ribbon in the bonded pre-form on both the ribbon surfaces and the ribbon lateral edges during subsequent milling or similar cutting steps. The result is a surprising and unexpected improvement in the appearance and mechanical and magnetic properties of the finished component, compared to components machined without external support or with jigging or similar support and constraint on fewer than all sides of the bonded pre-form. The multi-sided support permits components, particularly ones with intricate shapes, to be formed that could not be made with prior art methods, which would have resulted in unacceptable levels of fracture, chipping, or other mechanical degradation of the ribbon layers. Support on all sides is particularly beneficial for processing amorphous and nanocrystalline metal alloys, which are often more brittle than other crystalline alloys, including the optimized Fe-based alloys also useful in the practice of the present invention.

As used herein, the term "supported on all sides" is intended to mean support covering at least substantially all the external surface of the bonded pre-form in the area proximate the one or more positions at which material is removed during milling operations. For example, it is important in forming the toroidal stator 60 depicted by FIG. 6 that the top and the inside and outside surfaces of the toroidal bonded pre-form be supported by the containment means, such as the milling assembly depicted by FIG. 4. In particular, the support in this configuration extends from the top surface down to at least about the level of the ultimate slot depth, and preferably substantially below the slot depth. More preferably, substantially all the top and inside and outside surfaces are supported. Most preferably, substantially all the top, bottom, inside, and outside surfaces are supported, as provided by the milling assembly structure 40 shown in FIG. 4.

Figure 8A:
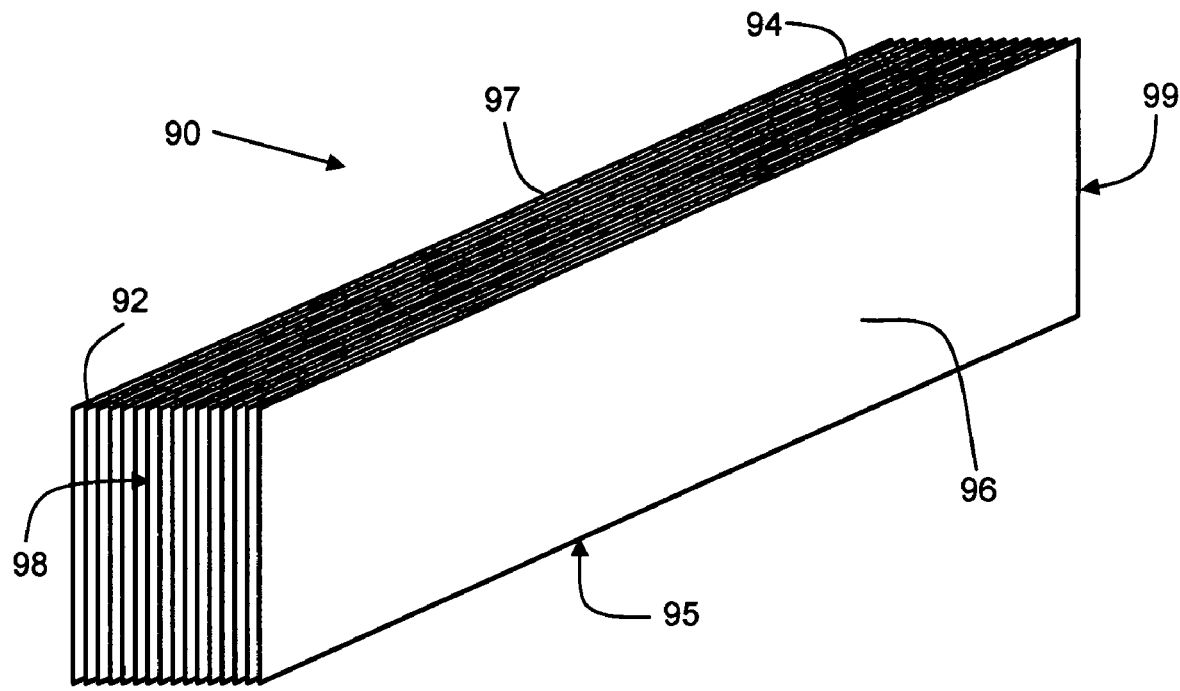
FIG. 8A is a perspective view of a rectangular prismatic pre-form of the invention.

In other implementations, the present method employs pre-forms having other shapes, which also must be suitably supported during milling. For example, FIG. 8A depicts a rectangular prismatic pre-form 90 comprising flat layers 92 of metal strips that are stacked in registry. Pre-form 90 is beneficially employed to prepare various shapes, including the E-shaped component 120 illustrated in FIG. 8B. It will be understood that for milling of stacked rectangular prismatic pre-form 90 from top surface 94, support and constraint must be provided at least on top surface 94, which is delineated by the collective edges of one side of the constituent stacked ribbons 92, and on front and back faces 96 and 97, which are defined by the large flat surfaces of outermost ribbon layers 92. Support and constraint on the prism ends 98, 99, defined by the registered ends of the ribbon pieces, is optional but preferred, especially if the end sections of the pre-form are to be used and not discarded as scrap. Optionally, the support on the sides 96, 97 of the rectangular prism 90 defined by the ribbon surfaces need not extend over the entire ribbon width down to bottom surface 95 if the appointed milling operation provides slots that extend only part-way from the top surface 94, such as slots 124 of E-shaped component 120 in FIG. 8B. However, in other embodiments, the milling operation comprises one or more cuts extending completely through the pre-form. For example, one cut may be used to form a gapped toroid useful as an inductor core. Alternatively, one or more through cuts may be used to sever one or more electromagnetic components from the pre-form. In either case, it is required that support extend over substantially all the top, bottom, inside, and outside surfaces of the pre-form. Coverage of substantially all the required surfaces prevents excessive delamination and other deterioration of ribbon that is not to be removed and nominally remains part of the final electromagnetic component.

Figure 2:
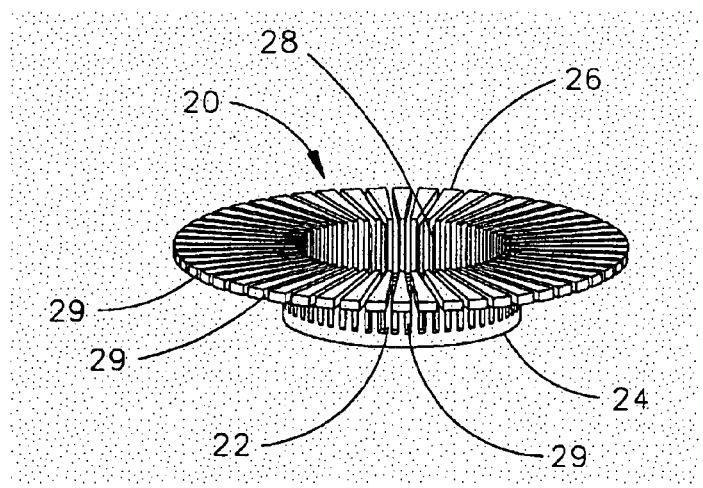
FIG. 2 is a perspective view depicting an inner winding hat used in the practice of the invention.
Figure 3:
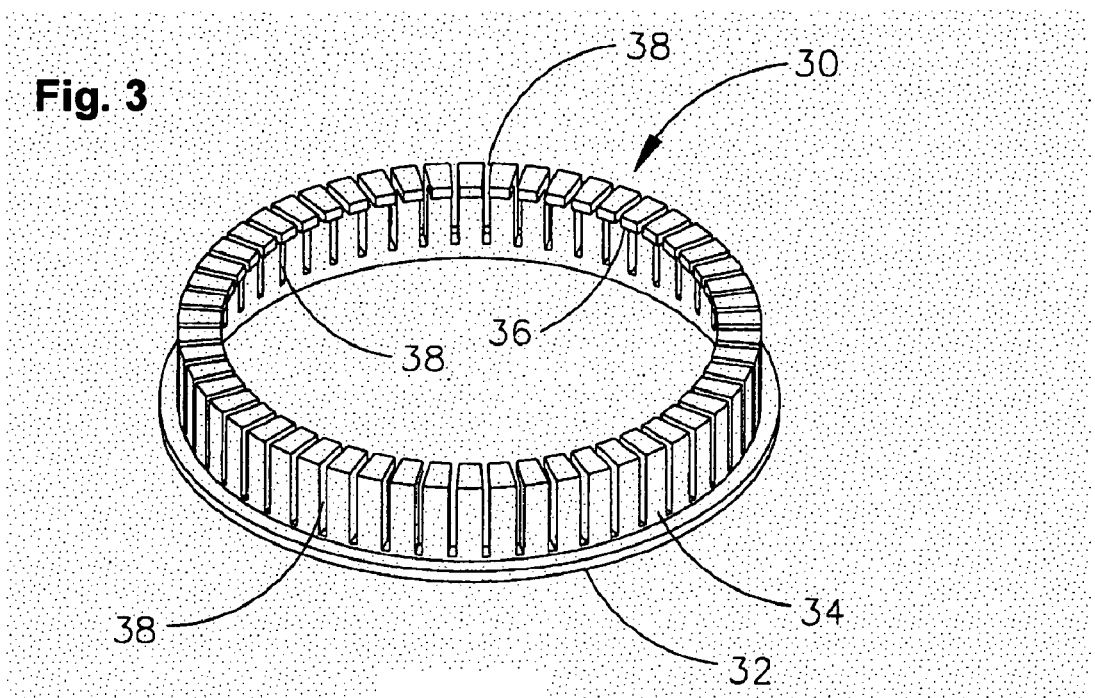
FIG. 3 is a perspective view depicting an outer winding hat used in the practice of the invention.
Figure 4:
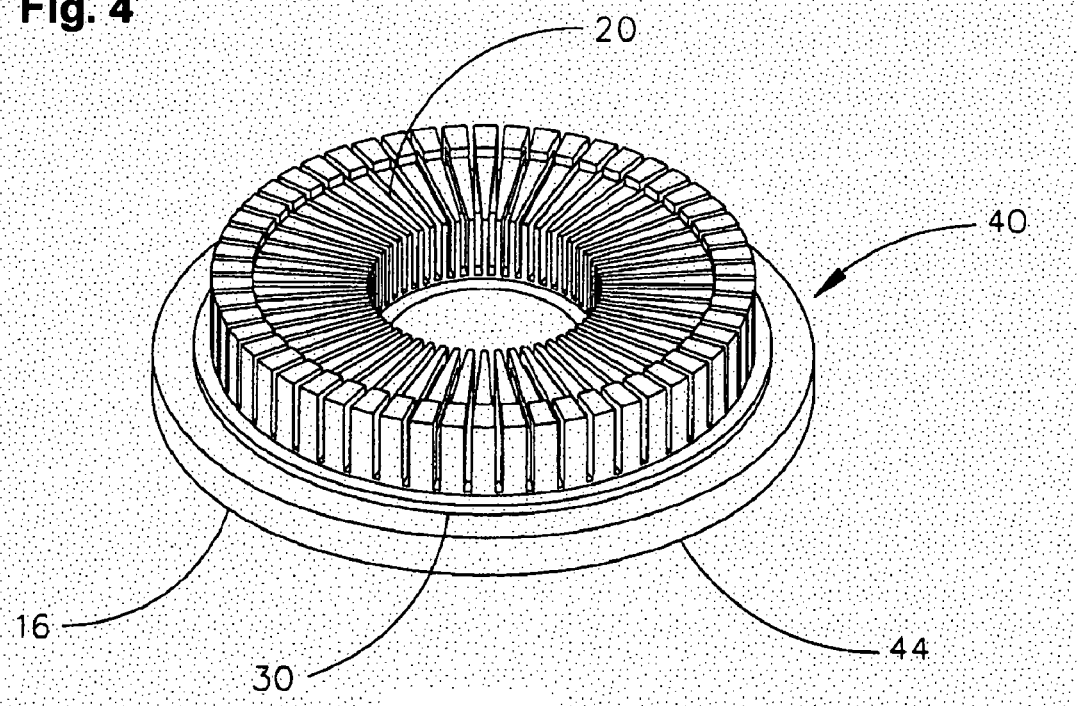
FIG. 4 is a perspective view depicting a milling assembly of the invention.

One form of containment means suitable for milling a toroidal bonded pre-form is depicted by FIGS. 2-4, and comprises inner containment hat 20 and outer containment hat 30. FIG. 2 shows inner containment hat 20, which is a cylinder comprised of a number of columns 22 extending upward from the inner containment hat base 24. Fingers 26 extend radially outward from columns 22 at approximately a right angle. Fingers 26 increase in width as they extend further from the columns 22. Fingers 26 are arranged in a circle, forming an annulus 28. The columns 22 and fingers 26 form a plurality of inner containment hat grooves 29. Columns 22 of inner containment hat 20 are placed inside inner ring 14. The height of columns 22 is approximately equal to the height of the soft magnetic metal toroid 18. The diameter of the soft magnetic metal toroid 18 is about equal to the diameter of the annulus 28.

Following the placement of inner containment hat within soft magnetic metal toroid 18, outer containment hat 30, which is shown in FIG. 3, is placed around soft magnetic metal toroid 18. Outer containment hat 30 is generally cylindrical, with a base 32. Bars 34 extend upward from base 32. At the top of each bar 34 is a lug 36 extending inward. Lug 36 for each bar 34 forms a flange for securing the amorphous metal toroid 18 within outer containment hat 30. Bars 34 and lugs 36 form a plurality of outer containment hat grooves 38.

Milling assembly 40, shown in FIG. 4, is then assembled. Soft magnetic metal toroid 18, still containing inner ring 14, along with the inner containment hat 20 is placed within outer containment hat 30. Lugs 36 and fingers 26 are aligned. Milling assembly 40 contains the soft magnetic metal toroid 18 within a toroidal geometry. Alternatively, soft magnetic metal toroid 18 could be placed within outer containment hat 30 and inner containment hat 20 prior to treatment with the adhesive. Optionally, the components of milling assembly 40 are secured together with the pre-form contained therewithin using a retainer (not shown), which may comprise any combination of components such as one or more surrounding rings, bolts, rivets, clamps, banding, or the like, After application of the adhesive and placement within the mechanical constraints of the inner ring 14, inner containment hat 20, and outer containment hat 30, the soft magnetic metal toroid 18 has sufficient structural integrity to withstand the stresses of milling. In some implementations, the containment hats and one or both of the inner and outer rings are integrally formed. As used herein, by the term "hat" is meant a structure having at least a generally planar end face and a curved, circumferential face perpendicular to the end face, the faces of the hat generally being configured to match the shape of a desired pre-form and provide support and containment thereto.

Milling plate 44 is placed on the bottom of the soft magnetic metal toroid 18. Milling plate 44 could be the same as winding plate 16.

Soft magnetic metal toroid 18, having been treated with an adhesive, is thus firmly contained within a structure, allowing soft magnetic metal toroid 18 to be milled and formed in three dimensions. Complex shapes can thus be constructed from the metal ribbon toroid 18, allowing structures such as electromagnetic components to be made from the soft magnetic metal toroid 18.

Although hats 20 and 30 are shown as being single pieces, it will be understood that the hats or any other fixtures employed in the containment means could be provided in sections that are secured together by a suitable retainer to form suitable containment. For example, the containment means used to form a generally cylindrical electromagnetic component might comprise a plurality of initially separate segments that are suitably joined to subtend the full cylindrical circumference. Other forms of containment means and techniques to secure the containment means are also possible. The hats or other fixtures can also be provided as substantially solid structures prior to their initial use for milling, and may be used sacrificially for a single forming operation. Preferably, the hats or like fixtures are reused for the sake of cost. The hats or other fixturing can be composed of any material that is compatible with the magnetic ribbon and provides sufficient mechanical strength at the required use temperatures. Additionally, it is preferred that fixturing used during heat processing have a coefficient of thermal expansion that matches that of the magnetic materials well enough to preclude imposition of deleterious stress. A preferred class of materials is 300-series, non-magnetic stainless steel.

In another aspect of the present method, a magnetic field is imposed on the component during at least a portion of the heat treatment cycle. The field is supplied either by high-temperature permanent magnets, such as samarium-cobalt or alnico magnets, or by an electromagnet structure. Such fields are optionally directed by use of magnetic materials, such as mild steel, in the containment means.

Figure 5:
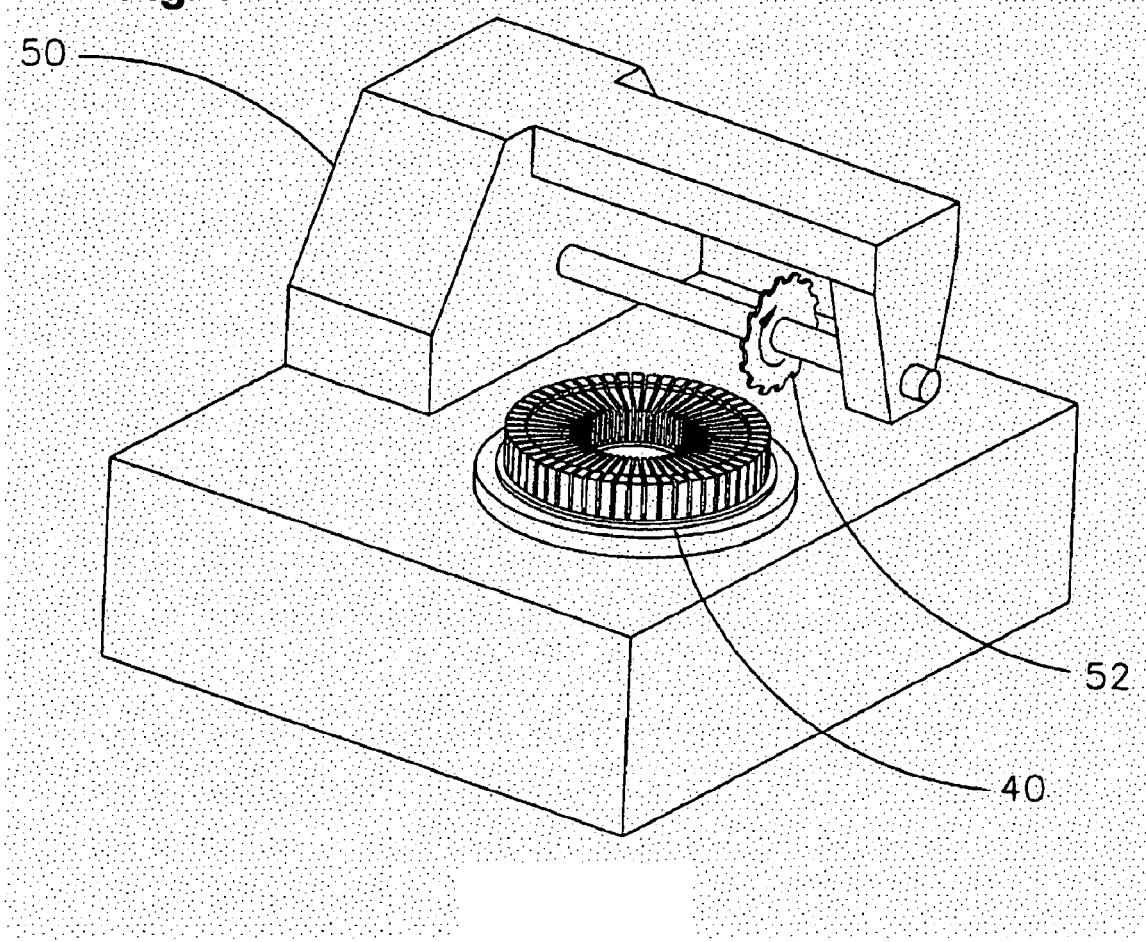
FIG. 5 is a perspective view depicting the milling of milling assembly in accordance with the invention.

As illustrated by FIG. 5, milling assembly 40 is placed in mill 50. Mill 50 could be a horizontal mill, a vertical mill, a CNC machine, or any other type of mill. However, as seen in FIG. 5, for milling a toroidal pre-form, the axis of rotation of the mill tool 52 in mill 50 preferably is substantially perpendicular to the toroid axis of the soft magnetic metal toroid 18. By having the axis of rotation of the mill tool 52 perpendicular to the winding axis of the soft magnetic metal toroid 18, the tool impinges the ribbon perpendicular to the ribbon surfaces, and the depth and width of the slots milled into the soft magnetic metal toroid 18 can be finely controlled.

Mill 50 cuts slots or other geometries into the soft magnetic metal toroid 18. Inner ring 14, still contained within soft magnetic metal toroid 18, acts as a positive mechanical stop for the inside edge of soft magnetic metal toroid 18. Inner ring 14, in conjunction with the epoxy adhesive, does not allow strips of soft magnetic metal ribbon 10 to separate during machining, thereby producing clean and accurate cuts. Slots cut in toroid 18 or other component structures typically are used either to accommodate coil windings or to permit the component to be mechanically secured, e.g. in a dynamoelectric machine housing or in a static inductive device using screws, bolts, rivets, circumferential banding, or the like.

By arranging the rotation axis exclusively perpendicular to the winding axis as shown in FIG. 5, the slots created in a right circular toroid pre-form are radially directed, as depicted by FIG. 6. In some embodiments, the rotation axis might alternatively be somewhat canted in either the horizontal or vertical planes to form slots that either deviate from exactly radial orientation or have side walls that deviate from verticality, as may be desirable for some applications.

After the soft magnetic metal toroid 18 is milled into an electromagnetic component shape, milling assembly 40 is removed from mill 50. Milling assembly 40 is then thermally processed in accordance with the recommendations of the manufacturer of soft magnetic metal ribbon 10 as required. Some soft magnetic ribbon materials require thermal processing to achieve the desired magnetic properties, while others require thermal processing to properly relieve the stresses in the milled electromagnetic component shape as a result of the milling process. For example, if the amorphous metal ribbon 10 is Metglas® amorphous alloy, thermal processing might comprise placing milling assembly 50 into a vacuum furnace at 695° F. (370° C.) for approximately sixty minutes. The thermal processing is optionally performed in the presence of an applied magnetic field to produce a favorable induced anisotropy axis and minimized losses. Thermal processing is also typically needed to induce recrystallization in nanocrystalline materials, as detailed hereinafter. It is conceivable that, given proper mechanical containment during milling, some materials would not require further thermal processing to achieve acceptable magnetic properties.

Following any thermal processing, the milling assembly 40 is disassembled by removing outer containment 30, inner containment hat 20, and inner ring 14, as well as any retainer used. Soft magnetic metal toroid 18 has thus been made into a soft magnetic metal electromagnetic component 60, shown in FIG. 6.

The component 60 is particularly useful as a stator core for a dynamoelectric machine. Commonly assigned U.S. Provisional application Ser. No. 60/444,271 ("the '271 application") and U.S. patent application Ser. No. 10/769,094 ("the '094 application") provide an axial airgap dynamoelectric machine in which such a stator is used. Each of the foregoing applications is incorporated herein in the entirety by reference thereto.

Figure 6A:
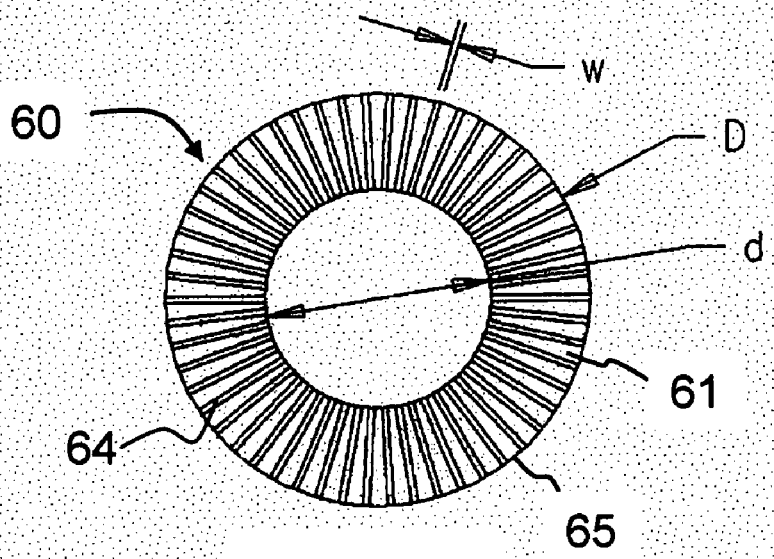
FIGS. 6A and 6B are top and side views, respectively, of an electromagnetic component of the invention.
Figure 6B:
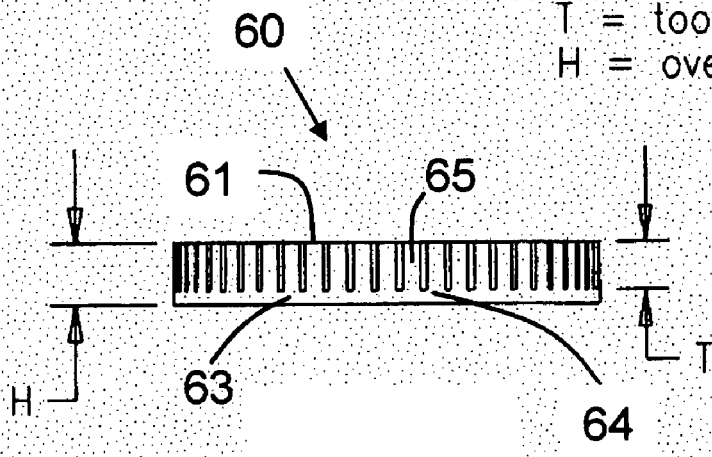

More specifically, FIG. 6 illustrate in top view (FIG. 6A) and side view (FIG. 6B) a part of a stator assembly 60 providing a unitary structure that includes integral stator tooth sections 65 axially depending from generally toroidal back-iron section 63. Slot spaces 64 between adjacent tooth sections are appointed to receive stator coils (not shown) wound around the tooth sections 65. Preferably the one or more stators are formed from low-loss materials, such as amorphous metal, nanocrystalline metal, or optimized Fe-based alloy.

The present invention further provides an inductive device incorporating one or more of the present electromagnetic components. The inductive device may have at least one air gap, but may also involve more complicated shapes with plural air gaps and plural magnetic circuits wherein the reluctance of the circuits is adjustable by varying the air gap in the core configuration chosen.

Figure 9:
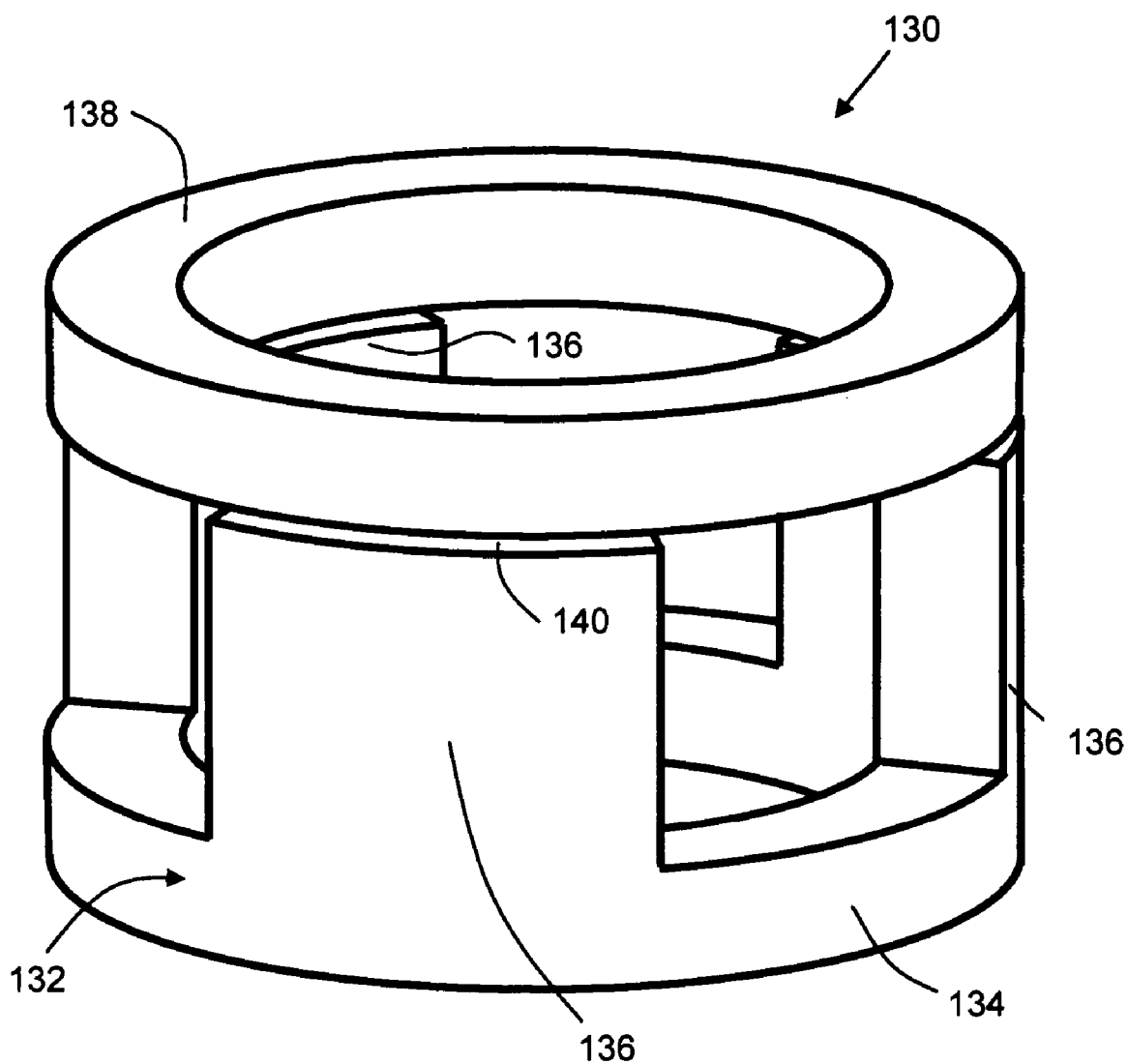
FIG. 9 is a perspective view of an inductive device of the invention.

For example, a polyphase inductor or transformer could be formed using the core 130 depicted by FIG. 9. Core 130 comprises unitary structure 132, which includes backiron section 134 and a plurality of legs 136 and a flux closure yoke provided by tape-wound toroid 138. The depicted embodiment includes three legs, and is suitable for a three-phase device. Unitary structure 132 may be prepared by the same method used to fabricate stator 60 shown in FIG. 6. One phase winding (not shown) is placed encircling each of legs 136 to form a polyphase inductor. A transformer would, of course, employ a winding pair on each leg. An inductor or transformer could also be formed by aligning two generally identical components 132 of the type shown in FIG. 9, with the distal faces of their respective legs disposed in abutting, facing relationship. In either case, the core permeability and inductance are adjustable by varying the airgap between the facing legs or the airgap 140 between the leg ends and a planar side of yoke 138. The symmetry of the three legs of unitary structure 132 in either inductive device configuration desirably results in a substantially balanced electrical impedance characteristic. Of course, other configurations wherein the number of legs is any integral multiple of the desired number of phases are also suitable.

In still other implementations, the present method is used to construct generally polyhedrally shaped electromagnetic components, which may have various other geometries including, but not limited to, rectangular and square prisms and other polyhedra having planar, polygonal faces. In addition, any of the previously mentioned geometric shapes may include at least one arcuate surface, and preferably two oppositely disposed arcuate surfaces to form a generally curved or arcuate electromagnetic component. In some aspects, the milling step of the present method includes making at least one cut through the bonded pre-form, whereby at least one electromagnetic component is formed and severed from the bonded pre-form.

The invention also provides components wherein the polyhedral shape is generally cylindrical and may further comprise a plurality of teeth extending radially inward or outward from a generally annular portion. Complete stators and rotors for certain types of electric motors advantageously employ such toothed electromagnetic components in accordance with the present invention. Those stators and rotors may have either a unitary construction or they may be formed from a plurality of pieces, which collectively form the completed component. Alternatively, a stator and/or rotor may be a composite structure comprised either entirely of the present electromagnetic components amorphous metal parts or of a combination of one or more of the present electromagnetic components with other magnetic materials.

For example, an inductive component similar in configuration to that depicted by FIG. 9 could also be provided using three generally arcuate components to form just the legs 136, with top and bottom toroidally wound back-iron segments like yoke 138 providing flux closure. Individually formed arcuate tooth sections mated with a wound toroid backiron section may also be used to manufacture an axial airgap stator similar to that shown in FIG. 6. Such arrangements make even more efficient use of material, since the material removed to form the slots in the FIG. 6 or FIG. 9 configuration is ordinarily lost as scrap during milling. Individual arcuate components, on the other hand, can be formed with the loss of only a small amount of material in a narrow tool kerf. As a result, each cylindrical pre-form would generally provide extra arcuate teeth. The teeth for these implementations might be manufactured using a cylindrical toroidal pre-form having the desired inside and outside diameters. Preferably the teeth are manufactured from a toroid pre-form of substantially the same inside and outside diameters as the backiron section, although the teeth might also be formed from a pre-form having different inside and outside diameters but the same build as the backiron toroid. In some configurations having a large number of teeth, each subtending only a small circumferential angle, polyhedral wedges might be substituted for arcuate teeth. Such polyhedral wedge-shaped teeth may be prepared from a starting rectangular prism pre-form, e.g. as shown by FIG. 8A.

Figure 10A:
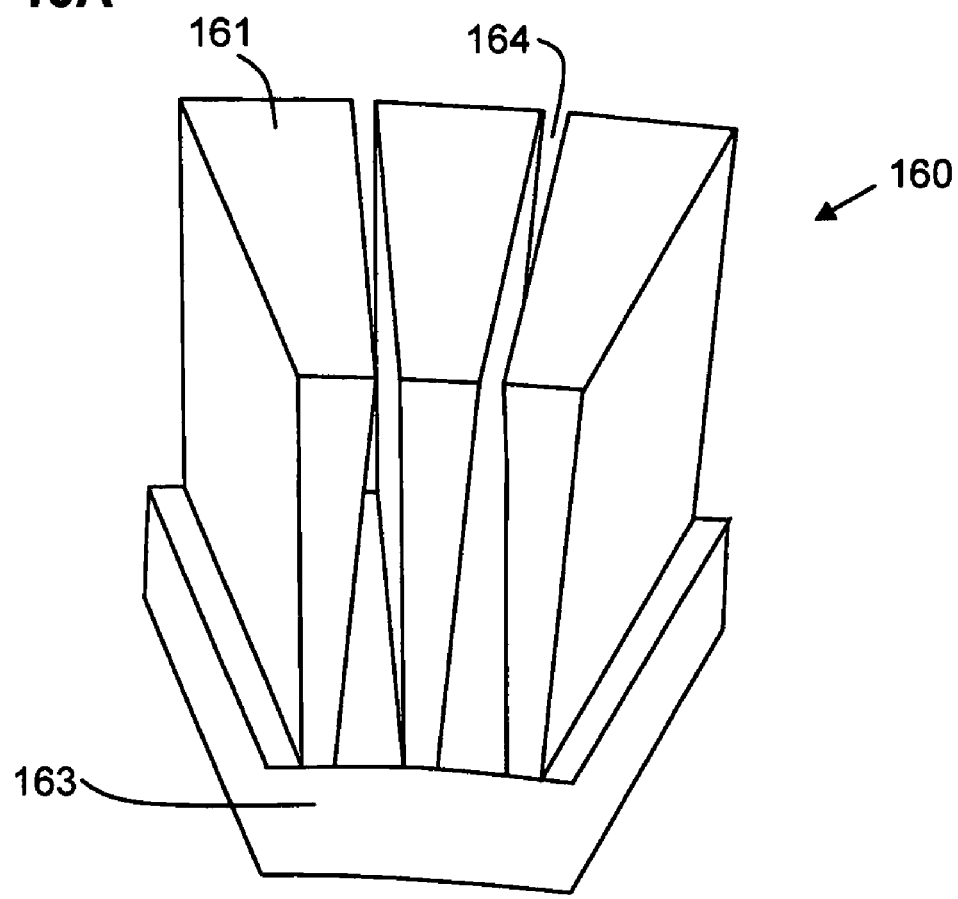
FIG. 10A is a fragmentary, perspective view of an axial airgap stator of FIG. 10A manufactured in accordance with the invention.
Figure 10B:
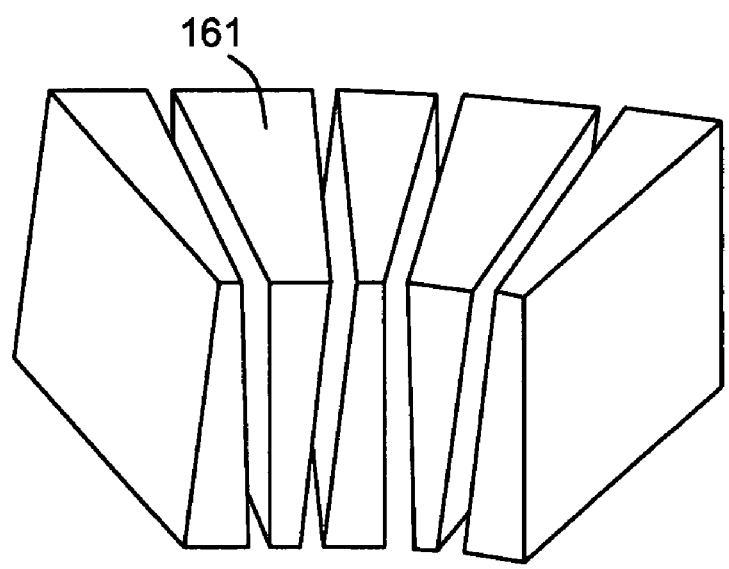
FIG. 10B is a fragmentary, perspective view of teeth for the axial airgap stator manufactured in accordance with the invention.

The use of individually formed teeth also allows for additional shape flexibility. For example, as depicted by FIG. 10A, use of discrete teeth permits manufacture of an axial airgap stator 160 wherein slots 164 are widened at the tooth root near the junction with backiron 163. Wedge shaped teeth provide extra space for windings, move the windings away from the operative airgap to reduce conductor eddy current loss, and reduce flux levels in the tooth tips. In an implementation as seen in FIG. 10B, wedge-shaped teeth 161 could be cut from a toroidal pre-form by canting the milling tool axis alternately for cutting each tooth. Such teeth could also be cut from a rectangular pre-form.

The separate teeth and backiron sections in the foregoing configurations are secured together by any appropriate means. For example, the constituent parts may be joined using an adhesive, clamping, welding, or other methods known in the art. A variety of adhesive agents may be suitable, including those composed of epoxies, varnishes, anaerobic adhesives, cyanoacrylates, and room-temperature-vulcanized (RTV) silicone materials. Adhesives desirably have low viscosity, low shrinkage, low elastic modulus, high peel strength, high operating temperature capability, and high dielectric strength.

Figure 11A:
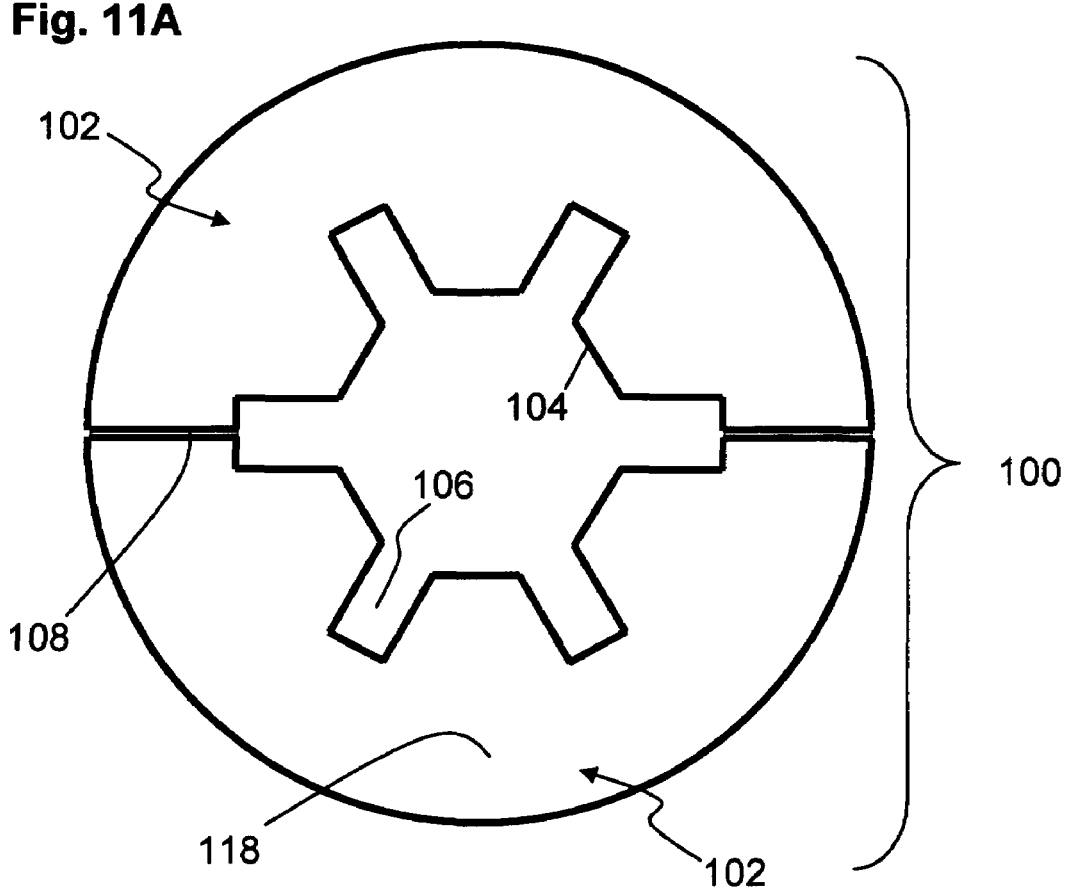
FIG. 11A is a plan view of a radial airgap stator manufactured in accordance with the invention.
Figure 11B:
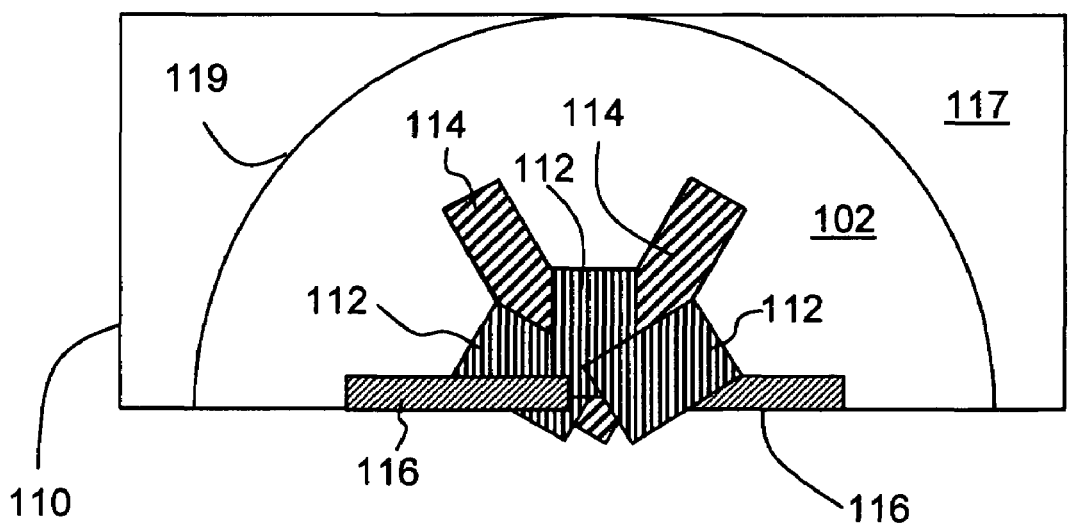
FIG. 11B is a plan view depicting the manufacture of a portion of the radial airgap stator of FIG. 11A in accordance with the invention.

FIG. 11 depict another embodiment that provides a radial airgap stator 100 having teeth 104 that project radially inward. The depicted implementation provides complementary semi-circular stator sections 102 that are assembled to form a full stator 100. A generally rectangular pre-form 110 is provided and milled using a series of cuts that remove material to form the teeth and slots between adjacent ones of the teeth and the outside circumference. Removal of material in areas 112 forms the teeth 104. Areas 114 are milled to form slots 106. Half slots are formed by removal of material in area 116 in the depicted embodiment. Careful machining permits minimization of the demagnetization caused by parasitic airgap 108 where sections 102 are joined. In the embodiment depicted by FIG. 11A, material in area 117 is fully removed to provide a semicircular outside circumference 119 for each stator half 102. Optionally, some or all of the material in area 117 is not removed. In such implementations, a lower flux density is attained in backiron area 118. In other implementations, more than two stator sections are prepared in a similar manner, each providing the requisite part of the full circumference.

The toroidal pre-form of FIG. 1 is easily and conveniently wound and makes efficient use of material. Accordingly, it is preferred for the manufacture of some types of electromagnetic components, such as the foregoing stator and inductor. However, other pre-form shapes are also useful, including the rectangular pre-form of FIG. 8A. Still another pre-form geometry might comprise a plurality of ribbons bent to form an arcuate shape, a "C" shape, or the like.

Generally polyhedrally shaped electromagnetic components constructed in accordance with the present invention can have various geometrical shapes, including rectangular, square, and trapezoidal prisms, and the like. In addition, any of the previously mentioned geometric shapes may include at least one arcuate surface, and preferably two oppositely disposed arcuate surfaces, to form a generally curved or arcuate electromagnetic component.

Figure 8B:
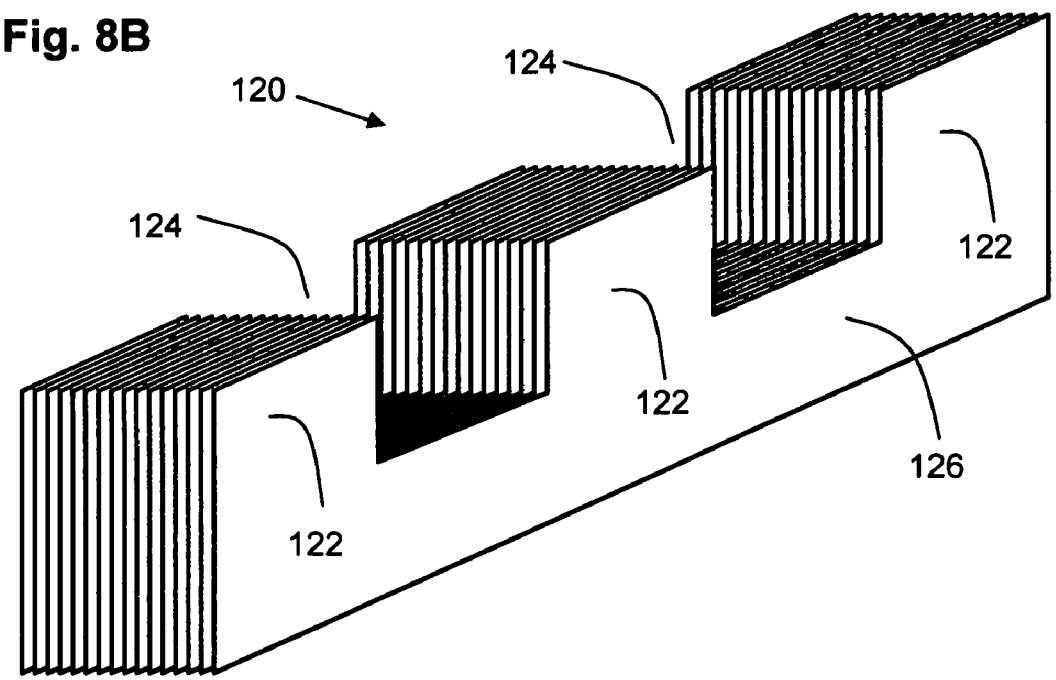
FIG. 8B is a perspective view of an E-shaped electromagnetic component of the invention made from the pre-form of FIG. 8A.

An inductive device of the invention preferably is assembled from constituent polyhedrally shaped components, preferably ones having overall shapes generally similar to those of certain block letters such as "C," "U," "E," and "I" by which they are identified. Such shapes are conveniently prepared by machining rectangular prismatic pre-forms using the aforementioned methods. FIG. 8B depicts an "E" component produced from a rectangular prismatic pre-form.

The inductive device is assembled by securing the components in adjacent relationship with a securing means, thereby forming at least one magnetic circuit. The securing means might comprise adhesive attachment, clamping, banding, welding, or other like methods. In the assembled configuration the layers of magnetic metal strip in each of the components lie in substantially parallel planes. Each of the components has at least two mating faces that are brought proximate and parallel to a like number of complementary mating faces on other components. Some of the shapes, e.g. C, U, and E shapes, terminate in mating faces that are generally substantially co-planar. The I (or rectangular prismatic) shape may have two parallel mating faces at its opposite ends or one or more mating faces on its long sides. Preferably the mating faces are perpendicular to the planes of the constituent ribbons in the component to minimize core loss. Some embodiments of the invention further comprise bulk magnetic components having mating faces that are mitered relative to the elongated direction of features of the component.

The present method is also useful for producing components for a linear motor or actuator. A preferred configuration comprises a series of teeth that depend generally perpendicularly from an extended backiron section. This form is similar to the E-component 120 of FIG. 8B, but has additional teeth 122 and slots 124 and may be prepared using similar techniques.

Low Loss Magnetic Materials

The present component, which preferably incorporates laminated layers of ribbon of at least one material selected from the group consisting of amorphous and nanocrystalline metals and optimized Fe-based alloy permits construction of devices operable at frequencies well above typical line frequencies. For example, dynamoelectric machines can be operated with synchronous excitation frequencies as high as 400 Hz or more, with only a relatively small increase in core loss, as compared to the unacceptably large increase that would be seen in conventional machines. The use of low-loss materials in these components (particularly in stator cores) accordingly allows the development of high-frequency, high pole count, electric devices capable of providing increased power density, and improved efficiency without excessive thermal derating. Preferably the stator assembly comprises laminated layers composed of at least one material selected from the group consisting of amorphous, nanocrystalline, or optimized Fe-based alloy.

Amorphous Metals

Amorphous metals exist in many different compositions suitable for use in the present components. Metallic glasses are typically formed from an alloy melt of the requisite composition that is quenched rapidly from the melt, e.g. by cooling at a rate of at least about $10^{6o}$ C./s. They exhibit no long-range atomic order and have X-ray diffraction patterns that show only diffuse halos, similar to those observed for inorganic oxide glasses. A number of compositions having suitable magnetic properties are set forth in U.S. Pat. No. RE32,925 to Chen et al. Amorphous metal is typically supplied in the form of extended lengths of thin ribbon (e.g. a thickness of at most about 50 μm) in widths of 20 cm or more.

A process useful for the formation of metallic glass strips of indefinite length is disclosed by U.S. Pat. No. 4,142,571 to Narasimhan. An exemplary amorphous metal material suitable for use in the present invention is METGLAS® 2605 SA1, sold by Metglas, Inc., Conway, S.C. in the form of ribbon of indefinite length and up to about 20 cm wide and 20-25 µm thick (see http://www.metglas.com/products/page5_1_2_4.htm). Other amorphous materials with the requisite properties may also be used.

Amorphous metals have a number of characteristics that must be taken into account in the manufacture and use of magnetic implements. Unlike most soft magnetic materials, amorphous metals (also known as metallic glasses) are hard and brittle, especially after the heat treatment typically used to optimize their soft magnetic properties. As a result, many of the mechanical operations ordinarily used to process conventional soft magnetic materials are difficult or impossible to carry out on amorphous metals. Stamping, punching, or cutting as-produced material generally results in unacceptable tool wear and is virtually impossible on brittle, heat-treated material. Conventional drilling and welding, which are often done with conventional steels, are also normally precluded.

Amorphous metals also exhibit a higher coefficient of magnetostriction than certain conventional materials. A material with a lower coefficient of magnetostriction undergoes smaller dimensional change under the influence of a magnetic field, which in turn would likely reduce audible noise from a machine, as well as render the material more susceptible to degradation of its magnetic properties as the result of stresses induced during machine fabrication or operation.

Despite these challenges, an aspect of the present invention provides components that successfully incorporate advanced soft magnetic materials and permits device operation with high frequency excitation, e.g., an exciting frequency greater than about 400 Hz. Construction techniques for the fabrication of the device are also provided.

The amorphous metals exhibit much lower hysteresis losses at high frequencies, which result in much lower core losses. Compared to Si—Fe alloys, amorphous metals have much lower electrical conductivity and are typically much thinner than ordinarily used Si—Fe alloys, which are often 200 µm thick or more. Both these characteristics promote lower eddy current core losses. The present fabrication techniques successfully provide components that benefit from one or more of these favorable attributes and thereby operates efficiently at high frequencies, using a configuration that permits the advantageous qualities of the amorphous metal, such as the lower core loss, to be exploited, while avoiding the challenges faced in previous attempts to use advanced materials.

Nanocrystalline Metals

Nanocrystalline materials are polycrystalline materials with average grain sizes of about 100 nanometers or less. The attributes of nanocrystalline metals as compared to conventional coarse-grained metals generally include increased strength and hardness, enhanced diffusivity, improved ductility and toughness, reduced density, reduced modulus, higher electrical resistance, increased specific heat, higher thermal expansion coefficients, lower thermal conductivity, and superior soft magnetic properties. Nanocrystalline metals also have somewhat higher saturation induction in general than most Fe-based amorphous metals.

Nanocrystalline metals may be formed by a number of techniques. One preferred method comprises initially casting the requisite composition as a metallic glass ribbon of indefinite length, using techniques such as those taught hereinabove, and forming the ribbon into a desired configuration such as a wound shape. Thereafter, the initially amorphous material is heat-treated to form a nanocrystalline microstructure therein. This microstructure is characterized by the presence of a high density of grains having average size less than about 100 nm, preferably less than about 50 nm, and more preferably about 10-20 nm. The grains preferably occupy at least 50% of the volume of the iron-base alloy. These preferred materials have low core loss and low magnetostriction. The latter property also renders the material less vulnerable to degradation of magnetic properties by stresses resulting from the fabrication and/or operation of a device comprising the component. The heat treatment needed to produce the nanocrystalline structure in a given alloy must be carried out at a higher temperature or for a longer time than would be needed for a heat treatment designed to preserve therein a substantially fully glassy microstructure. Preferably, the nanocrystalline metal is an iron-based material. However, the nanocrystalline metal could also be based on or include other ferromagnetic materials, such as cobalt or nickel. In addition, nanocrystalline materials are typically even more brittle than annealed amorphous metals, rendering them even harder to stamp.

Representative nanocrystalline alloys suitable for use in constructing magnetic elements for the present device are known, e.g. alloys set forth in U.S. Pat. No. 4,881,989 to Yoshizawa and U.S. Pat. No. 5,935,347 to Suzuki et al. Such materials are available from Hitachi Metals, Vacuumschmelze GmbH, and Alps Electric. An exemplary nanocrystalline metal with low-loss properties is Hitachi Finemet FT-3M. Another exemplary nanocrystalline metal with low-loss properties is Vacuumschmelze Vitroperm 500 Z.

Optimized Fe-Based Alloys

The present component may also be constructed with optimized, low-loss Fe-based crystalline alloy material. As used herein, the term "optimized Fe-based alloy" refers collectively to grain-oriented and non-grain-oriented Fe-based materials which have lower cores losses than the crystalline, Fe-based motor and electrical steels materials conventionally used in dynamoelectric machines, and which frequently have higher saturation induction than amorphous or nanocrystalline materials. Preferably such material has the form of strip having a thickness of less than about 125 µm, much thinner than the steels conventionally used in dynamoelectric machines and other inductive devices, which have thicknesses of 200 µm or more, and sometimes as much as 400 µm or more. As used herein, an oriented material is one in which the principal crystallographic axes of the constituent crystallite grains are not randomly oriented, but are predominantly correlated along one or more preferred directions. As a result of the foregoing microstructure, an oriented strip material responds differently to magnetic excitation along different directions, whereas a non-oriented material responds isotropically, i.e., with substantially the same response to excitation along any direction in the plane of the strip. Grain-oriented material is preferably disposed in the present machine with its easy direction of magnetization substantially coincident with the predominant direction of magnetic flux.

As used herein, conventional Si—Fe refers to silicon-iron alloys with a silicon content of about 3.5% or less of silicon by weight. The 3.5 wt. % limit of silicon is imposed by the industry due to the poor metalworking material properties of Si—Fe alloys with higher silicon contents. The core losses of the conventional Si—Fe alloy grades resulting from operation at a magnetic field with frequencies greater than about 400 Hz are substantially higher than those of low loss material. For example, in some cases the losses of conventional Si—Fe may be as much as 10 times those of suitable amorphous metal at the frequencies and flux levels encountered in machines operating under the frequency and flux levels taught herein. As a result, in many embodiments conventional material under high frequency operation would heat to a point at which a conventional device could not be cooled by any acceptable means. However, some grades of silicon-iron alloys, herein referred to as optimized Si—Fe, are directly applicable to producing a high-frequency device.

The optimized Fe-based alloys useful in the practice of the present invention include silicon-iron alloy grades comprising greater than 3.5% of silicon by weight, and preferably more than 4%. The non-grain-oriented Fe-based material used in constructing devices in accordance with the invention preferably consists essentially of an alloy of Fe with Si in an amount ranging from about 4 to 7.5 wt. % Si. These preferred alloys have more Si than conventional Si—Fe alloys. Also useful are Fe—Si—Al alloys such as Sendust.

More preferred non-oriented optimized alloys have a composition consisting essentially of Fe with about 6.5±1 wt. % Si. Most preferably, alloys having about 6.5% Si exhibit near-zero values of saturation magnetostriction, making them less susceptible to deleterious magnetic property degradation due to stresses encountered during construction or operation of a device containing the material.

The objective of the optimization is to obtain an alloy improved magnetic properties, including reduced magnetostriction and especially, lower core losses. These beneficial qualities are obtainable in certain alloys with increased silicon content made by suitable fabrication methods. In some cases, these optimized Si—Fe alloy grades are characterized by core losses and magnetic saturation similar to those of amorphous metal. However, alloys containing more than about 4 at. % Si are difficult to produce by conventional means because of their brittleness due to short-range ordering. In particular, conventional rolling techniques used to make conventional Si—Fe are generally incapable of making optimized Si—Fe. However, other known techniques are used to make optimized Si—Fe.

For example, one suitable form of Fe-6.5Si alloy is supplied as magnetic strips 50 and 100 μm thick by the JFE Steel Corporation, Tokyo, Japan (see also http://www.jfe-steel.co.jp/en/products/electrical/supercore/index.html). Fe-6.5% Si produced by rapid solidification processing, as disclosed by U.S. Pat. No. 4,865,657 to Das et al. and U.S. Pat. No. 4,265,682 to Tsuya et al., also may be used. Rapid solidification processing is also known for preparing Sendust and related Fe—Si—Al alloys.

Loss Behavior of Preferred Soft Magnetic Materials

A major contribution to the improved losses in the materials preferred for the present component results from significantly reduced hysteresis losses. As is known in the art, hysteresis losses result from impeded domain-wall motion during the magnetization of all soft magnetic materials. Such losses are generally higher in conventionally used magnetic materials, such as conventional grain-oriented Si—Fe alloys and non-oriented motor and electrical steels, than in the improved materials preferably employed in the present components. High losses, in turn, can contribute to the overheating of the core.

More specifically, it is found that the core loss of soft magnetic materials can generally be expressed by the following modified Steinmetz equation:

$$L = a \cdot f \cdot B^b + c \cdot f^d \cdot B^e \quad (1)$$

wherein:
L is the loss in W/kg,
f is the frequency in kHz,
B is the magnetic flux density in peak Tesla, and
a, b, c, and d and e are all empirical loss coefficients specific to any particular soft magnetic material.

Each of the above loss coefficients a, b, c, d and e, can generally be obtained from the manufacturer of a given soft magnetic material. Especially preferred for use in the present stator structure are low core loss magnetic materials characterized by a core loss less than "L" where L is given by a form of Eqn. (1), in which $L = 12 \cdot f \cdot B^{1.5} + 30 \cdot f^{2.3} \cdot B^{2.3}$.

The ability to use much higher exciting frequencies permits dynamoelectric machines constructed with the present components to be designed with a much wider range of possible pole counts. The number of poles in the present device is a variable based on the permissible machine size (a physical constraint) and on the expected performance range. Subject to allowable excitation frequency limits, the number of poles can be increased until magnetic flux leakage increases to an undesirable value, or performance begins to decrease.

Having thus described the invention in rather full detail, it will be understood that such detail need not be strictly adhered to, but that various changes and modifications may suggest themselves to one skilled in the art. For example, any references to claim elements in the singular, using the articles "a," "an," "the," or "said," are not to be construed as limiting the element to the singular. It is accordingly intended that such modifications be encompassed by the scope of the invention, as defined by the subjoined claims.

What is claimed is:

1. A method for manufacturing a soft magnetic metal electromagnetic component comprising the steps of:
forming soft magnetic metal ribbon having edges into a pre-form comprising a plurality of stacked or wound layers of the ribbon, the edges being in registry and the ribbon consisting essentially of a material selected from the group consisting of amorphous and nanocrystalline metals and optimized Fe-based alloy;
containing the pre-form within a containment means that supports the pre-form on all sides;
milling the pre-form contained within the containment means into a electromagnetic component shape; and
thermally processing the electromagnetic component shape into an electromagnetic component at a thermal processing temperature,
and wherein the containing step comprises the steps of applying an adhesive to the pre-form; and curing the adhesive to form a bonded pre-form, the curing being carried out at a heat curing temperature less than the thermal processing temperature.

2. The method of claim 1, further comprising the step of thermally processing the pre-form.

3. The method of claim 2, wherein the thermal processing step is carried out after the milling step.

4. The method of claim 2, wherein the thermal processing step is carried out in the presence of an applied magnetic field.

5. The method of claim 1, wherein the soft magnetic metal ribbon consists essentially of a material selected from the group consisting of amorphous and nanocrystalline metals.

6. The method of claim 1, wherein the pre-form comprises layers of the soft magnetic ribbon wound into a toroid having a toroid axis and an inner side surface, an outer side surface, a top and a bottom.

7. The method of claim 6, wherein the toroid is a right circular cylinder having a cylindrical toroid axis and the step of milling the pre-form into the electromagnetic component shape comprises milling the toroid with a cutting tool rotating about an axis substantially perpendicular to the cylindrical toroid axis.

8. The method of claim 1, wherein the pre-form comprises layers of the soft magnetic ribbon stacked to form a rectangular prism.

9. The method of claim 1, wherein the milling step comprises at least one cut through the pre-form.

10. The method of claim 1, wherein the heat curing temperature is a fraction of the thermal processing temperature ranging from about ¼ to ¼.

11. The method of claim 1, wherein the containment means comprises a milling assembly.

12. A method for manufacturing a soft magnetic metal electromagnetic component comprising the steps of:
   forming soft magnetic metal ribbon having edges into a pre-form comprising a plurality of layers of the ribbon wound into a toroid having a shape of a right circular cylinder having a toroid axis, an inner side surface, an outer side surface, a top, and a bottom, the edges being in registry;
   containing the pre-form within a milling assembly, comprising placing an inner ring of the milling assembly circumferentially about at least a portion of the inner side surface;
   applying an adhesive to the pre-form within the milling assembly;
   curing the adhesive to form a bonded pre-form;
   milling the bonded pre-form contained within the milling assembly into an electromagnetic component shape; and
   thermally processing the bonded pre-form.

13. The method of claim 12, wherein the soft magnetic ribbon consists essentially of a material selected from the group consisting of amorphous and nanocrystalline metals and optimized Fe-based alloy.

14. The method of claim 13, wherein the soft magnetic ribbon consists essentially of a material selected from the group consisting of amorphous and nanocrystalline metals.

15. The method of claim 12, wherein the thermal processing step is carried out after the milling step.

16. The method of claim 12, wherein the thermal processing step is carried out in the presence of an applied magnetic field.

17. The method of claim 12, wherein the inner ring is placed about substantially all of the inner side surface.

18. The method of claim 12, including the step of providing milling grooves within the milling assembly, and the step of milling the pre-form into the electromagnetic component shape further includes milling through the milling grooves.

19. The method of claim 12, wherein the step of milling the bonded pre-form into the electromagnetic component shape comprises milling the bonded pre-form with a cutting tool rotating about an axis substantially perpendicular to the toroid axis.

20. The method of claim 12, wherein the milling assembly is composed of non-magnetic stainless steel.

21. The method of claim 12, wherein the milling assembly is disassembled after the thermally processing the bonded pre-form.

22. The method of claim 12, wherein the milling step forms at least one slot in the electromagnetic component shape.

23. The method of claim 12, wherein the milling step comprises at least one cut through the bonded pre-form.

24. The method of claim 23, wherein the electromagnetic component is severed from the bonded pre-form by the at least one cut therethrough.

25. The method of claim 12, wherein the step of containing the pre-form within a milling assembly further comprises the step of:
   placing an outer ring of the milling assembly circumferentially about at least a portion of the outer side surface.

26. The method of claim 25, wherein the step of containing the pre-form within a milling assembly further comprises the step of:
   placing at least one hat of the milling assembly on at least a portion of the top.

27. The method of claim 26, further comprising the step of placing a retainer to secure the bonded pre-form within the milling assembly.

28. The method of claim 12, wherein the step of containing the pre-form within a milling assembly further comprises the step of:
   placing at least one hat of the milling assembly on at least a portion of the top.

29. A method for manufacturing a soft magnetic metal electromagnetic component comprising the steps of:
   winding soft magnetic metal ribbon about a winding axis into a toroid, the toroid having an inner side, an outer side, a top and a bottom;
   placing an inner ring on the inner side;
   placing an inner containment hat on the top and inner side;
   placing an outer containment hat on the top and outer side;
   placing a retainer around the outer containment hat;
   applying adhesive to the toroid; curing the adhesive;
   milling the toroid while disposed within the inner and outer containment hats into an electromagnetic component shape;
   applying a magnetic field to the electromagnetic component shape; and
   thermally processing the electromagnetic component shape into an electromagnetic component.

30. The method of claim 29, wherein the inner containment hat has a plurality of inner containment hat slots and the outer containment hat has a plurality of outer containment hat slots, and the step of milling the toroid into the electromagnetic component shape comprises milling the electromagnetic component shape through the inner containment hat slots and the outer containment hat slots.

31. The method of claim 29, wherein the step of milling the toroid into the electromagnetic component shape occurs with a cutting tool rotating about an axis substantially perpendicular to the winding axis.

32. The method of claim 29, wherein the step of milling the toroid into an electromagnetic component shape occurs with a cutting tool rotating about an axis canted relative to the winding axis.

33. The method of claim 29, wherein the thermal processing step is carried out after the milling step.

* * * * *